Sept. 11, 1923.
J. J. STARK
1,467,956
DENTAL ATTACHMENT
Filed Dec. 5, 1922
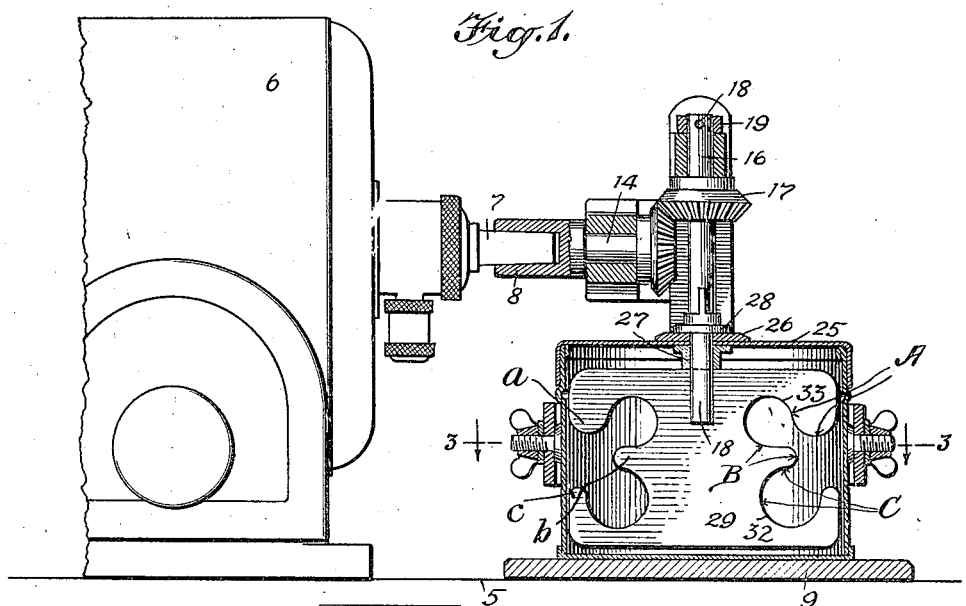
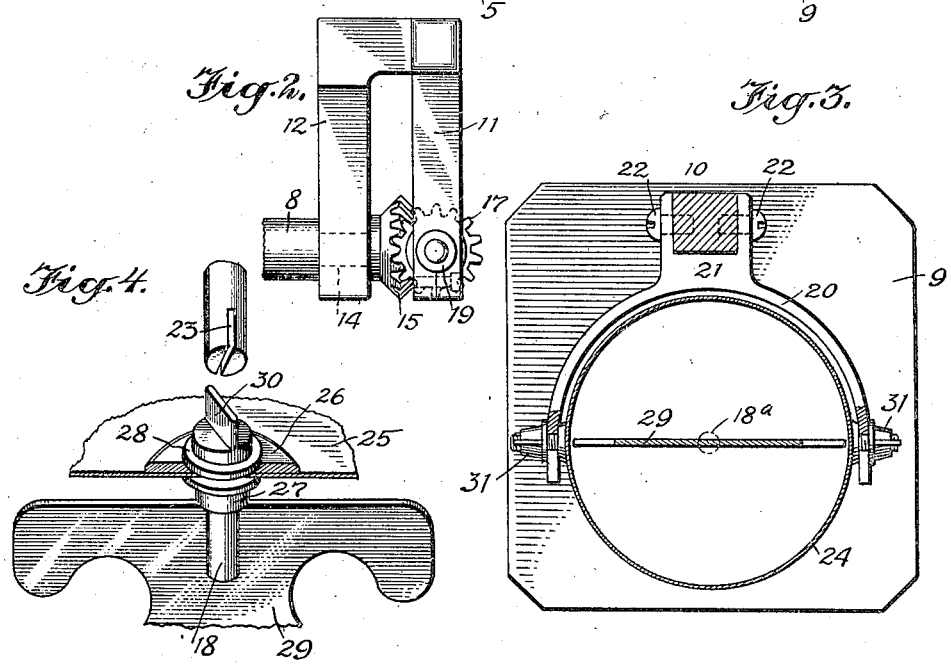
WITNESSES
INVENTOR
JACOB J. STARK
BY
ATTORNEYS Patented Sept. 11, 1923.

1,467,956

UNITED STATES PATENT OFFICE.

JACOB J. STARK, OF BROOKLYN, NEW YORK.

DENTAL ATTACHMENT.

Application filed December 5, 1922. Serial No. 605,134.

*To all whom it may concern:*

Be it known that I, JACOB J. STARK, a citizen of the United States, and a resident of the city of New York, borough of Brooklyn, in the county of Kings and State of New York, have invented certain new and useful Dental Attachments, of which the following is a full, clear, and exact description.

This invention relates to attachments for dental lathes, and more particularly aims to provide, as a new article of manufacture, a power mixer for material for making dental casts, and comprising a self-contained structure attachable to the horizontal spindle of a dental lathe, such structure including a receptacle for the mix, and a beater therein rotatable about a horizontal axis.

Another object is to provide a structure of the kind just indicated in which a simple, inexpensive and rugged frame has a base so shaped and carries an operative connection between a coupling for the lathe spindle and the beater shaft in such a way, that the tendencies of the rotating parts combine to maintain the support flat and secure on the lathe table, during operation of the mixer, and without having to screw or clamp the support to such table.

A further object is to provide a collection of parts as last described and including a receptacle for the mix to be acted on by the beater, which is readily removable from the new structure even without disengaging the latter from the lathe.

Still a further object is to provide a combination of parts adapted to attain the various ends above enumerated and also including a beater shaft vertically journalled in the receptacle and adapted for instantaneous engagement with and disengagement from the lower end of a vertical shaft forming a permanent part of the self-contained structure and adapted to be aligned with the beater shaft; such engagement and disengagement of the two vertical shafts naturally accompanying a horizontal translation of the receptacle into and out of the self-contained structure.

A further object is to provide the combination of parts as characterized above, in which the receptacle will have a vertically removable cover forming the permanent support in which is journalled the beater shaft; to the end that said shaft may permanently carry the beater in such a way and be associated with the body of the receptacle in such a way that the beater may properly act on the mix in the receptacle and yet be withdrawn from such mix with the cover when the latter is removed following removal of the receptacle from the self-contained structure.

A further object of the invention is to provide a structure as already explained, in which the beater is a plane plate and yet provided with shaped edges so arranged and related that a surprisingly efficient spiral agitation of the mix results from rotation of the beater, thereby to obtain a thorough mix in a fraction of the time heretofore required.

With these and various other objects in view, the invention consists of certain novel features of construction, and combinations and arrangements of parts, as will hereinafter be described and pointed out in the claims.

In the accompanying drawing, which shows by way of example, a possible structure according to the invention as at present preferred, and in which simliar reference characters refer to similar parts throughout the several views:

Fig. 1 is a vertical axial section taken through the self-contained structure constituting the new attachment, as coupled to a dental lathe, such lathe and certain of the parts of the attachment being shown in elevation;

Fig. 2 is a fragmentary view, in plan, showing the main post of the structure and the two shaft-journalling arms thereof;

Fig. 3 is a horizontal central view, taken on line 3—3 of Fig. 1, but with certain of the parts shown in plan and some of these parts partially broken away; and Fig. 4 is a partial sectional, composite view, looking upward towards the bottom of the permanent vertical shaft of the self-contained structure and looking downward toward the top of the beater shaft above the receptacle cover.

Upon a conventional lathe table 5 is anchored a familiar dental lathe as indicated at 6 provided with a horizontal shaft or spindle terminating as shown in a projecting coned end 7 constituting really a chuck for a taper-bored coupling of the type indicated at 8.

Such coupling here is a permanent part of the new self-contained structure, which structure comprises merely a flat base-plate 9, a rear vertical post 10, a straight forwardly projecting higher horizontal arm 11, an L-shaped lower horizontal arm 12, a horizontal stud shaft 14 journalled in the forward end of arm 12 and carrying fixedly on one end coupling 8 and at its other end a bevel gear 15, a vertical stud shaft 16 journalled in the front end of arm 11 and carrying fixedly at its lower end a bevel gear 17 meshing with gear 15 and pinned as at 18 to hold collar 19, and a horizontally extending semi-circular yoke 20 forked as shown at its free forward ends and merging backwardly at its middle into a bifurcated shank 21 anchored on vertical post 10 by means of screws 22.

After pointing out only that the lower end of vertical shaft 16 is kerfed rather deeply as marked 23 in Fig. 4, it will be seen that the entire self-contained structure constituting the new attachment has been completely described, with the exception of the removable parts thereof constituting the mix receptacle and beater.

Such receptacle is here a cylindrical can 24 having a familiar type of removable cover 25.

Cover 25 has a central circular hole surrounded at the top by an annular plate 26 and at its bottom by a bushing or sleeve 27, thus forming a journalling means for the beater shaft 28, so that said shaft, with the parts arranged as in Fig. 1, may be vertically aligned with shaft 16. Above plate 26 the beater shaft carries a rather wide collar 28 for giving a good, steady, anti-vibration support to the beater shaft; and the presence of this shoulder, combined with a suitable securement, as by rivets (not shown), of the beater 29 to the lower portion of the beater shaft where the latter extends down below collar 27, holds the beater shaft permanently in journalled support on the can proper. To this end, and to provide a balanced structure, the last-mentioned portion of the beater shaft is diametrally slotted to provide two semi-cylindrical tines on opposite sides of the upper portion of the beater as indicated at 18ª in Fig. 3.

The upper end of the beater shaft has a reduced extension in the nature of a transverse rib marked 30 in Fig. 4, and it will thus be seen that to insert can (filled with a mix), can-cover, beater, and beater shaft in the new structure, and to simultaneously key up the two vertical shafts for rotation together, it is merely necessary to slide the can horizontally over base-plate 9 until the can lies within yoke 20; the beater shaft being adjusted, if necessary, to advance rib 30 into kerf 23. Thus the can, and all its carried parts rest merely by gravity on the base-plate, and so may be instantaneously removed for an inspection of the mix.

In order to secure the can in place in the yoke when the vertical shafts are keyed together as just explained, the following parts are provided: On opposite sides of the can exterior, opposite the free forked ends of the yoke 20, there are provided a pair of lugs in which are set as shown threaded stems for permanently adjustably carrying wing nuts 31.

Before closing this specification, stress should be laid on the design of the beater 29 of plane plate formation as above stated. This beater, when provided with the cut-out portions illustrated at opposite sides thereof, has been found in actual tests to pass very easily through the usual mix required for dental work, thus to impose no undesirable strains on the relatively light can or any other part of the self-contained structure, and yet to complete the mix to the required thoroughness in a very small fraction of the time needed for beaters of other constructions experimented with. It would seem that a spiral agitation of the mix occurs; it being observed in this connection that each of these cut-out portions of the beater defines a scalloped side therefor near the side wall of the can, and that such edge really defines what may be better termed a two-leaved clover, but with the lower leaf 32 larger than the upper leaf 33. Also, it will be noted that the lower leaf is the one more removed from the axis of rotation of the beater, and that therefore such scalloped edge may be said to be on a line inclined to the axis of rotation of the beater, and also inclined upwardly toward said axis. Perhaps to describe the present beater construction most clearly and definitely, as to such cut-out portions, it is pointed out that the scalloped edge above mentioned includes at least three reversely curved portions, as indicated at A, B and C, thereby to provide three horns *a*, *b* and *c*, such horns having rounded crests with the root portions of the horns and the space between the central horn *b* and a horn *a* or *c* established by an edge portion of circular curvature.

It will thus be seen that the structure provided is one well calculated to attain the various ends and objects hereinabove stated and indicated; although in this connection it should be understood that the structure shown in the drawing is merely illustrative of various possible ways of carrying out the invention, and so may be varied in various and sundry particulars without departing from the scope of protection contemplated, as indicated by the claims following.

I claim.

1. In a mixer for dental casts, the combination with a cylindrical container for a mass to be mixed, of a rotatable stirrer member including a beater arranged diametrically of the container for rotation about the axis of the container, said beater being a thin plane plate having a straight bottom edge close to and substantially parallel with the bottom of the container and having side edges above said bottom each close to and substantially parallel with the side wall of the container, said plate having a portion cut away from one side edge of the plate to provide a scalloped side edge for the plate, said scalloped edge including at least three reversely curved portions.

2. The mixer defined in claim 1, wherein such reversely curved edge portions establish three smoothly rounded horns.

JACOB J. STARK.